(12) United States Patent
Konishi et al.

(10) Patent No.: US 8,758,941 B2
(45) Date of Patent: Jun. 24, 2014

(54) POSITIVE ELECTRODE MATERIAL FOR LITHIUM ION SECONDARY BATTERY AND LITHIUM ION SECONDARY BATTERY USING THE SAME

(75) Inventors: Hiroaki Konishi, Hitachi (JP); Toyotaka Yuasa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 740 days.

(21) Appl. No.: 12/696,803

(22) Filed: Jan. 29, 2010

(65) Prior Publication Data

US 2010/0221609 A1    Sep. 2, 2010

(30) Foreign Application Priority Data

Feb. 27, 2009    (JP) .................. 2009-045045

(51) Int. Cl.
| | |
|---|---|
| H01M 4/13 | (2010.01) |
| H01M 4/525 | (2010.01) |
| H01M 4/131 | (2010.01) |
| H01M 4/36 | (2006.01) |
| H01M 4/52 | (2010.01) |
| H01M 10/052 | (2010.01) |
| H01M 4/02 | (2006.01) |

(52) U.S. Cl.
CPC .............. H01M 4/525 (2013.01); H01M 4/131 (2013.01); H01M 4/364 (2013.01); H01M 4/52 (2013.01); *H01M 10/052* (2013.01); *H01M 2004/028* (2013.01); *H01M 2004/027* (2013.01)
USPC ..................... 429/231.3; 429/231.1; 429/223; 429/231.5; 252/182.1

(58) Field of Classification Search
CPC ..... H01M 4/525; H01M 4/131; H01M 4/364; H01M 4/52; H01M 10/052; H01M 2004/028; H01M 2004/027
USPC ........................ 429/231.1, 231.3, 223, 231.5; 252/182.1
See application file for complete search history.

(56) References Cited

U.S. PATENT DOCUMENTS

| | | |
|---|---|---|
| 2005/0202316 A1 | 9/2005 | Hwang et al. |
| 2010/0136393 A1 | 6/2010 | Takezawa et al. |

FOREIGN PATENT DOCUMENTS

| | | |
|---|---|---|
| JP | 2004-47180 A | 2/2004 |
| JP | 2004-127694 A | 4/2004 |
| JP | 2005-259703 A | 9/2005 |
| JP | 2006-302880 A | 11/2006 |
| JP | 2006-344509 A | 12/2006 |
| JP | 2008-117611 A | 5/2008 |
| WO | WO 2009/016801 A1 | 2/2009 |

OTHER PUBLICATIONS

Chinese Office Action with English translation date Apr. 5, 2012 (fourteen (14) pages.

*Primary Examiner* — Laura Weiner

(74) *Attorney, Agent, or Firm* — Crowell & Moring LLP

(57) ABSTRACT

This invention provides a positive electrode material having high capacity and safety, and a lithium ion secondary battery using the positive electrode material, the lithium ion secondary battery using a positive electrode active substance comprising a first transition metal oxide represented by the compositional formula: $Li_{x1}Ni_{a1}Mn_{b1}Co_{c1}M_{d1}O_2$; a second transition metal oxide represented by the compositional formula: $Li_{x2}Ni_{a2}Mn_{b2}Co_{c2}M_{d2}O_2$; and a third transition metal oxide represented by the compositional formula: $Li_{x3}Ni_{a3}Mn_{b3}Co_{c3}M_{d3}O_2$; in which $a3<a2<a1$.

8 Claims, 2 Drawing Sheets

POSITIVE ELECTRODE MATERIAL FOR LITHIUM ION SECONDARY BATTERY AND LITHIUM ION SECONDARY BATTERY USING THE SAME

BACKGROUND OF THE INVENTION

1. Field of the Invention

The present invention relates to a positive electrode material having high capacity and high safety for a lithium ion secondary battery, and to a lithium ion secondary battery.

2. Description of the Related Art

For the application of a lithium ion secondary battery to a plug-in hybrid car, it is necessary to decrease its cost, volume and weight while high safety is maintained. For such purposes, positive electrode materials are required to have high capacity and high safety.

JP-A-2008-117611 provides a positive electrode material having excellent float life characteristic and high safety by mixing three kinds of active substances of a lithium-nickel-cobalt manganese composite oxide having a space group R-3m, a lithium-nickel-cobalt composite oxide having a space group R-3m, and a lithium-manganese composite oxide having a space group Fd-3m. Since the lithium-manganese composite oxide of low capacity is contained in an amount of 20 to 35% by weight, this technique cannot obtain a high capacity as required for the application to plug-in hybrid cars and for achieving an object of the present invention.

In JP-A-2005-259703, a positive electrode material formed by mixing a nickel type compound and the cobalt type compound is used to improve the lifetime and safety at normal temperature and high temperature. Since in this technique two kinds of positive electrode active substances having different compositions are mixed, the ratio of at least one of the active substances is 50 mass % or more. This causes significant heat generation in a narrow temperature range at the positive electrode when the temperature of the battery increases due to internal short-circuit. The positive electrode material cannot provide a positive electrode material that causes gradual heat generation in a wide temperature region as in the invention.

JP-A-2004-127694 provides a positive electrode material having good cycle characteristic while high capacity is maintained by using a positive electrode active substance formed by coating the particle of a lithium nickel type composite oxide represented by the general formula $LiNi_{1-z}Al_zO_2$ ($0.01 \leq z \leq 0.1$) with a lithium transition metal oxide represented by the general formula: $LiNi_{1-x-y}Co_xMn_yO_2$. Since in this technique two kinds of positive electrode active substances having different compositions are mixed, the ratio of at least one of the active substances is 50 mass % or more. This causes significant heat generation in a narrow temperature range at the positive electrode when the temperature of the battery increases due to internal short circuit or the like. The positive electrode material cannot provide a positive electrode material that causes gradual heat generation in a wide temperature region as in the invention.

As described above, the prior arts described above have not been able to attain the high capacity and the high safety required for the battery for plug-in hybrid cars simultaneously.

SUMMARY OF THE INVENTION

For the application of the lithium ion secondary battery to plug-in hybrid cars, high capacity and high safety are required to be attained simultaneously.

In the lithium ion secondary battery, such properties have a close concern with the nature of the positive electrode material.

In a layered positive electrode material represented by the compositional formula $LiMO_2$ (M: transition metal), increasing the Ni content in the transition metal site is necessary for obtaining high capacity.

However, the positive electrode material of high Ni content has low structural stability during charging. With this positive electrode material, reaction between oxygen released from the structure due to change of the crystal structure of the positive electrode material and an electrolyte may cause a significant exothermic reaction in a certain temperature range at a relatively low temperature.

The invention provides a positive electrode material for a lithium ion secondary battery, having a positive electrode active substance represented by a compositional formula: $Li_xNi_aMn_bCo_cM_dO_2$ (in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and $a1+b1+c1+d1=1.0$), wherein the positive electrode active substance comprises at least three kinds of transition metal oxides each having different Ni contents.

According to the present invention, a positive electrode material for a lithium ion secondary battery of excellent capacity and safety can be obtained and a lithium ion secondary battery of excellent characteristics can be provided.

BRIEF DESCRIPTION OF THE DRAWING

Other objects and advantages of the invention will become apparent from the following description of embodiments with reference to the accompanying drawings in which.

DESCRIPTION OF PREFERRED EMBODIMENTS

Figure 1:
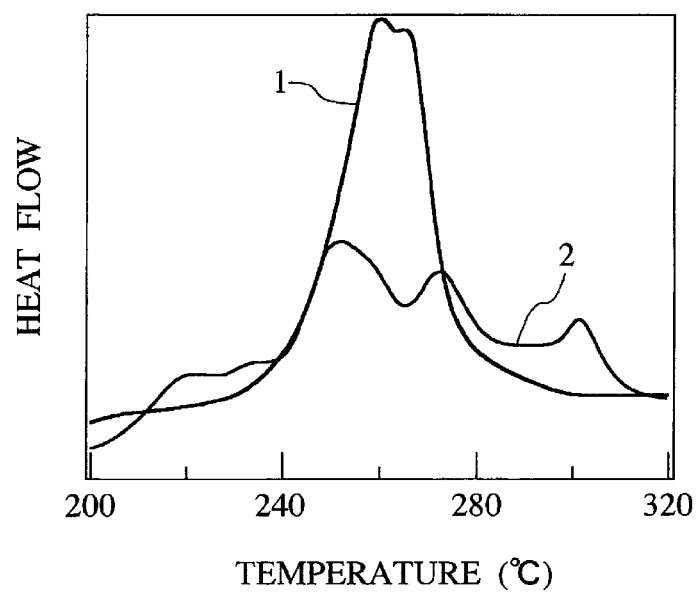
FIG. 1 shows the result of DSC measurement for a positive electrode active substance comprising a single transition metal oxide and a positive electrode active substance comprising three or more kinds of transition metal oxides.
Figure 2:
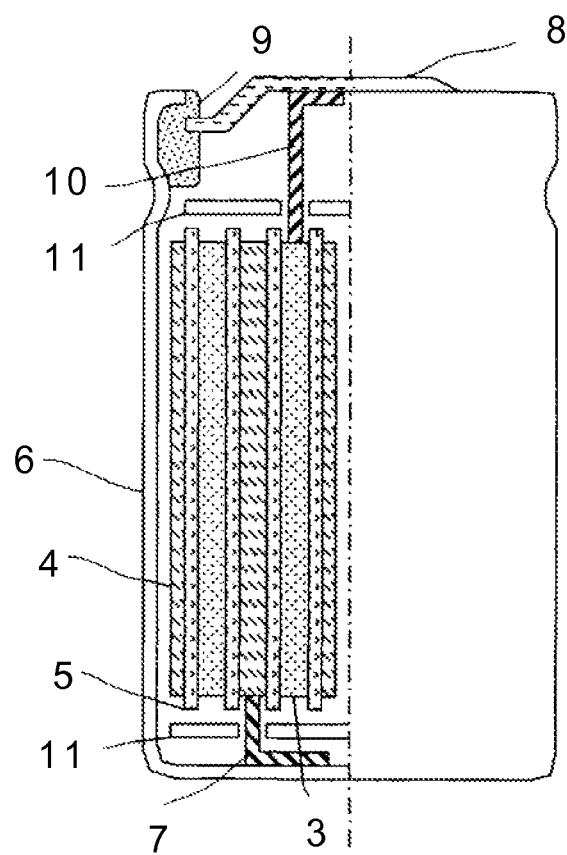
FIG. 2 is a schematic cross sectional view showing a lithium secondary battery. The wound electrodes and non-aqueous electrolyte are sealed in a battery container like a battery can.

The present invention will be described below.

In the lithium secondary battery, a separator 5 is interposed between a positive electrode 3 and a negative electrode 4. These positive electrode 3, negative electrode 4, and separator 5 are wound, and enclosed together with a nonaqueous electrolyte into a battery can 6. The positive electrode 3 is formed by applying a positive electrode mixture to a current collector (or conductive plate). The negative electrode 4 is formed by applying a negative electrode mixture to the current collector. A positive lead 10 is formed in the positive electrode 3 and an negative lead 7 is formed in the negative electrode 4, and current is extracted from these leads. Between the battery can 6 in contact with the negative lead 7 and a sealing lid portion 8 in contact with the positive lead 10, there is formed a packing 8 for preventing the leakage of the electrolyte and also separating the positive electrode from the negative electrode.

The positive electrode material for lithium ion secondary battery, in a first aspect, according to the invention has a positive electrode active substance represented by a compositional formula: $Li_xNi_aMn_bCo_cM_dO_2$ (in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and $a1+b1+$ c1+d1=1.0), wherein the positive electrode active substance comprises at least three kinds of transition metal oxides each having different Ni contents.

In the positive electrode active substances of different Ni contents according to the invention, the temperature range at which release of oxygen at full charge occurs upon temperature elevation is different with each other. Then, when positive electrode active substances having different compositions are mixed, release of oxygen occurs stepwise in a wide temperature range during temperature elevation to provide a positive electrode material having a wide temperature range in which heat generation occurs. As a result, since significant heat generation in a certain temperature range can be suppressed, with the use of heat release of the battery. This invention can provide a positive electrode material decreased in possibility of occurrence of ignition for use with a lithium ion secondary battery and a lithium secondary battery using the same.

More specifically, the transition metal oxide includes: a first transition metal oxide represented by the compositional formula: $Li_{x1}Ni_{a1}Mn_{b1}Co_{c1}M_{d1}O_2$ (in which $0.2 \leq x1 \leq 1.2$, $0.7 \leq a1 \leq 0.9$, $0.05 \leq b1 \leq 0.25$, $0.05 \leq c1 \leq 0.25$, $0 \leq d1 \leq 0.1$, and a1+b1+c1+d1=1.0); a second transition oxide represented by the compositional formula: $Li_{x2}Ni_{a2}Mn_{b2}Co_{c2}M_{d2}O_2$ (in which $0.2 \leq x2 \leq 1.2$, $0.55 \leq a2 \leq 0.8$, $0.05 \leq b2 \leq 0.4$, $0.05 \leq c2 \leq 0.4$, $0 \leq d2 \leq 0.1$, and a2+b2+c2+d2=1.0); and a third transition metal oxide represented by the compositional formula: $Li_{x3}Ni_{a3}Mn_{b3}Co_{c3}M_{d3}O_2$ (in which $0.2 \leq x3 \leq 1.2$, $0.2 \leq a3 \leq 0.65$, $0.05 \leq b3 \leq 0.5$, $0.05 \leq c3 \leq 0.5$, $0 \leq d3 \leq 0.1$, a3+b3+c3+d3=1.0), in which a3<a2<a1.

Preferably, the positive electrode active substance contains each of the transition metal oxides in an amount of 50 mass % or less. By decreasing the ratio of the active substance having one composition, the maximum value of the heat flow in a certain temperature range can be decreased greatly. Further, the difference of Ni content between the transition metal oxides is 0.05 or more.

Further, it is more preferable that a transition metal oxide satisfying that $0.7 \leq a$ in the Ni contents be contained 60 mass % or more in the positive electrode active substance. This makes it possible to provide a positive electrode material having high capacity.

Then, the invention provides, in a second aspect, a lithium ion secondary battery in which a positive electrode capable of absorbing and releasing lithium, a negative electrode capable of absorbing and releasing lithium are formed by way of an non-aqueous electrolyte and a separator, wherein the positive electrode has a positive electrode active substance, the positive electrode active substance comprising a transition metal oxide represented by the compositional formula: $Li_xNi_aMn_b Co_cM_dO_2$ (in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and a1+b1+c1+d1=1.0), the transition metal oxide including at least three kinds of transition metal oxides each having different Ni contents.

Further, in the same manner as described above, the transition metal oxides in an amount of 50 mass % or less. By decreasing the ratio of an active substance having one composition, the maximum value for the heat flow in a certain temperature range can be decreased remarkably. Further, the difference of Ni content between the transition metal oxides is 0.05 or more, and, more preferably, 0.1 or more.

Further, it is preferable that a transition metal oxide satisfying that $0.7 \leq a$ in the Ni contents be contained 60 mass % or more and 80 % or less in the positive electrode active substance. The ratio of 80% or less is preferred since the ratio of active substance that causes the heat generation at low temperature become higher when the ratio is more than 80%. This makes it possible to provide a positive electrode material of high capacity.

More specifically, the invention provides, in a third aspect, a lithium ion secondary battery in which a positive electrode capable of absorbing and releasing lithium, a negative electrode capable of absorbing and releasing lithium are formed by way of a non-aqueous electrolyte and a separator, wherein the positive electrode has a positive electrode active substance, the positive electrode active substance comprising: a first transition metal oxide represented by the compositional formula: $Li_{x1}Ni_{a1}Mn_{b1}Co_{c1}M_{d1}O_2$ (in which $0.2 \leq x1 \leq 1.2$, $0.7 \leq a1 \leq 0.9$, $0.05 \leq b1 \leq 0.25$, $0.05 \leq c1 \leq 0.25$, $0 \leq d1 \leq 0.1$, and a1+b1+c1+d1=1.0); a second transition metal oxide represented by the compositional formula: $Li_{x2}Ni_{a2}Mn_{b2}Co_{c2}M_{d2}O_2$ (in which $0.2 \leq x2 \leq 1.2$, $0.55 \leq a2 \leq 0.8$, $0.05 \leq b2 \leq 0.4$, $0.05 \leq c2 \leq 0.4$, $0 \leq d2 \leq 0.1$, and a2+b2+c2+d2=1.0); and a third transition metal oxide represented by the compositional formula: $Li_{x3}Ni_{a3}Mn_{b3}Co_{c3}M_{d3}O_2$ (in which $0.2 \leq x3 \leq 1.2$, $0.2 \leq a3 \leq 0.65$, $0.05 \leq b3 \leq 0.5$, $0.05 \leq c3 \leq 0.5$, $0 \leq d3 \leq 0.1$, and a3+b3+c3+d3=1.0);

in which a3<a2<a1.

Further, the positive electrode active substance contains the first transition metal oxide, the second transition metal oxide, and the third transition metal oxide in an amount of 50 mass % or less. The difference of Ni content between the first transition metal oxide, the second transition metal oxide, and the third transition metal oxide is 0.05 or more, and, more preferably, 0.1 or more.

An embodiment for practicing the invention is shown below.

In the example of the invention, a transition metal oxide represented by: $Li_xNi_aMn Co_cM_dO_2$ (in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and a1+b1+c1+d1=1.0) is used.

The amount of Li is: $0.2 \leq x \leq 1.2$, because the amount of Li present in the Li layer in a charged state is small and the layered crystal structure cannot be maintained when x<0.2, and because the amount of the transition metal in the composite oxide is decreased to lower the capacity when 1.2<x.

The amount of Ni is: $0.55 \leq a \leq 0.8$, because the Ni content that mainly contributes to the charge/discharge reaction is decreased to lower the capacity.

The amount of Mn is defined as $0.05 \leq b \leq 0.5$, because the structure in a charged state is instable to lower the temperature at which oxygen is released from the positive electrode when b<0.05 and because the content of Ni that mainly contributes to the charge/discharge reaction is decreased to lower the capacity when b<0.4.

The amount of Co is defined as: $0.05 \leq c \leq 0.5$, because the structure in the charged state is instable and the volume change of the positive electrode active substance is increased during charge/discharge when c<0.05 and because the content of Ni that mainly contributes to the charge/discharge reaction is decreased to lower the capacity when c>0.4.

The mount of M is defined as: $0 \leq d \leq 0.1$, because the content of Ni that mainly contributes to the charge/discharge reaction is decreased to lower the capacity when d<0.1.

(Preparation of Transition Metal Oxide A)

Nickel oxide, manganese dioxide, and cobalt oxide were used as the starting material and, after weighing such that Ni:Mn:Co ratio was 14:3:3 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of the solid content ratio, further they were mixed for one hour and pelleted and dried by a spray dryer. Lithium hydroxide and lithium carbonate were added to the pelleted particles such that Li:(NiMnCo) ratio was 1.05:1. Then, the powder was baked at 900° C. for 10 hours to obtain crystals of a layered structure. Subsequently, they were crushed to obtain a transition metal oxide A. Further, after removing coarse particles each having a diameter of 30 μm or more by classification, the oxide was used for the manufacture of an electrode.

Since Li was partially depleted during baking, the compositional formula of the positive electrode active substance A was $Li_{1.0}Ni_{0.7}Mn_{0.15}Co_{0.15}O_2$.

The method of manufacturing the positive electrode active substance in this example is not restricted to the method described above but, for example, the following method may also be used.

Ni, Mn, and Co were weighed so as to obtain an aimed composition and nickel/manganese/cobalt composite hydroxide particles were prepared by a coprecipitation method. After weighing the nickel/manganese/cobalt composite hydroxide and lithium hydroxide such that Li:(NiMnCo) ratio was 1.05:1, they were mixed sufficiently at such an intensity that the spherical shape of secondary particles was maintained. Then, the particles were baked at 900° C. for 10 hours to form crystals of a layered structure and then they were crushed to obtain a positive electrode active substance. Further, coarse particles each having a diameter of 30 μm or more were removed by classification of the positive electrode active substance.

TABLE 1

| Transition metal oxide | Atomic ratio | | | | |
|---|---|---|---|---|---|
| | Ni | Mn | Co | Al | Ti |
| A | 14 | 3 | 3 | — | — |
| B | 8 | 1 | 1 | — | — |
| C | 2 | 1 | 1 | — | — |
| D | 1 | 1 | 1 | — | — |
| E | 3 | 1 | 1 | — | — |
| F | 17 | 1 | 2 | — | — |
| G | 1 | 2 | 2 | — | — |
| H | 16 | 2 | 1 | 1 | — |
| I | 16 | 1 | 2 | — | 1 |

(Preparation of Transition Metal Oxide B)

Nickel oxide, manganese dioxide, and cobalt oxide were used as the starting material and, after weighing such that Ni:Mn:Co ratio was 8:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour and pelleted and dried by a spray dryer. Lithium hydroxide and lithium carbonate were added to the pelleted particles such that Li:(NiMnCo) ratio was 1.05:1. Then, the powder was baked at 850° C. for 10 hours to obtain crystals of a layered structure. Subsequently, they were crushed to obtain a transition metal oxide B. Further, after removing coarse particles each having a diameter of 30 μm or more by classification, the oxide was used for the manufacture of an electrode.

Since Li was partially depleted during baking, the compositional formula for the transition metal oxide B was $Li_{1.0}Ni_{0.8}Mn_{0.1}Co_{0.1}O_2$.

(Preparation of Transition Metal Oxide C)

Nickel oxide, manganese dioxide, and cobalt oxide were used as the starting material and, after weighing such that Ni:Mn:Co ratio was 2:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCo) ratio was 1.05:1. Then, the powder was baked at 900° C. for 10 hours to obtain crystals of a layered structure. Subsequently, they were crushed to obtain a transition metal oxide C. Further, after removing coarse particles each having a diameter of 30 μm or more by classification, the oxide was used for the manufacture of an electrode.

Since Li was partially depleted during baking, the compositional formula of the transition metal oxide C was $Li_{1.0}Ni_{0.5}Mn_{0.25}Co_{0.25}O_2$.

(Preparation of Transition Metal Oxide D)

Nickel oxide, manganese dioxide, and cobalt oxide were used as the starting material and, after weighing such that Ni:Mn:Co ratio was 1:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCo) ratio was 1.05:1. Then, the powder was baked at 950° C. for 10 hours to obtain crystals of a layered structure. Subsequently, they were crushed to obtain a transition metal oxide D. Further, after removing coarse particles each having a diameter of 30 μm or more by classification, they were used for the manufacture of an electrode.

Since Li was partially depleted during baking, the compositional formula of the transition metal oxide D was $Li_{1.0}Ni_{1/3}Mn_{1/3}Co_{1/3}O_2$.

(Preparation of Transition Metal Oxide E)

Nickel oxide, manganese dioxide, and cobalt oxide were used as the starting material and, after weighing such that Ni:Mn:Co ratio was 3:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCo) ratio was 1.05:1. Then, the powder was baked at 900° C. for 10 hours to obtain crystals of a layered structure. Subsequently, they were crushed to obtain a transition metal oxide E. Further, after removing coarse particles each having a diameter of 30 μm or more by classification, the oxide was used for the manufacture of an electrode.

Since Li was partially depleted during baking, the compositional formula of the transition metal oxide E was $Li_{1.0}Ni_{0.6}Mn_{0.2}Co_{0.2}O_2$.

(Preparation of Transition Metal Oxide F)

Nickel oxide, manganese dioxide, and cobalt oxide were used as the starting material and, after weighing such that Ni:Mn:Co ratio was 17:1:2 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCo) ratio was 1.05:1. Then, the powder was baked at 800° C. for 10 hours to obtain crystals of a layered structure. Subsequently, they were crushed to obtain a transition metal oxide F. Further, after removing coarse particles having a diameter of 30 μm or more by classification, the oxide was used for the manufacture of an electrode.

Since Li was partially depleted during baking, the compositional formula of the transition metal oxide F was $Li_{1.0}Ni_{0.85}Mn_{0.05}Co_{0.1}O_2$.

(Preparation of Transition Metal Oxide G)

Nickel oxide, manganese dioxide, and cobalt oxide were used as the starting material and, after weighing such that Ni:Mn:Co ratio was 1:2:2 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCo) ratio was 1.05:1. Then, the powder was baked at 950° C. for 10 hours to obtain crystals of a layered structure. Subsequently, they were crushed to obtain a transition metal oxide G. Further, after removing coarse particles each having a diameter of 30 μm or more by classification, the oxide was used for the manufacture of an electrode.

Since Li was partially depleted during baking, the compositional formula of the transition metal oxide G was $Li_{1.0}Ni_{0.2}Mn_{0.4}Co_{0.4}O_2$.

(Preparation of Transition Metal Oxide H)

Nickel oxide, manganese dioxide, cobalt oxide, and aluminum hydroxide were used as the starting material and, after weighing such that Ni:Mn:Co:Al ratio was 16:2:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour, and pelleted and dried by a spray dryer. Lithium hydroxide and lithium carbonate were added to the pelleted particles such that Li:(NiMnCoAl) ratio was 1.05:1. Then, the powder was baked at 850° C. for 10 hours to obtain crystals of a layered structure. Subsequently, they were crushed to obtain a transition metal oxide H. Further, after removing coarse particles each having a diameter of 30 μm or more by classification, the oxide was used for the manufacture of an electrode.

Since Li was partially depleted during baking, the compositional formula of the transition metal oxide H was $Li_{1.0}Ni_{0.8}Mn_{0.1}Co_{0.05}Al_{0.05}O_2$.

(Preparation of Transition Metal Oxide I)

Nickel oxide, manganese dioxide, cobalt oxide, and titanium oxide were used as the starting material and, after weighing such that Ni:Mn:Co:Ti ratio was 16:2:1:1 at an atomic ratio, pure water was added to form a slurry. The slurry was pulverized in zirconia bead mill till the mean particle size was 0.2 μm. A polyvinyl alcohol (PVA) solution was added to the slurry by 1 wt % on the basis of solid content ratio, further they were mixed for one hour and pelleted and dried by a spray dryer. Lithium hydroxide and lithium carbonate were added to the pelleted particles such that Li:(NiMnCoTi) ratio was 1.05:1. Then, the powder was baked at 850° C. for 10 hours to obtain crystals of a layered structure. Subsequently, they were crushed to obtain a transition metal oxide I. Further, after removing coarse particles each having a diameter of 30 μm or more by classification, the oxide was used for the manufacture of an electrode.

Since Li was partially depleted during baking, the compositional formula for the transition metal oxide I was $Li_{0.8}Ni_{0.8}Mn_{0.05}Co_{0.1}Ti_{0.05}O_2$.

Example 1

The transition metal oxide A and a carbonaceous conductive agent were weighed such that the mass ratio was 85:10.7 mass ratio and the active substance and the conductive agent were composited by using mechanofusion. In this case, respective active substance and the conductive agent may be composited also by using an instrument such as a hybridizer. The same operation was conducted for the transition metal oxides B and C. Then, three kinds of composited materials were mixed at mass ratio of 1:1:1. According to the method, the conductive agent can be dispersed highly on the surface of each of the active substances thereby coating the surface of the particles with the conductive agent. Since the electronic conductivity is improved by the coating with the conductive agent, when it is used as the positive electrode material, high capacity can be maintained even when a high current is supplied. Further, since the conductive agent is present between the active substances, when different active substances are mixed, a conductive network is formed between the active substances and the ratio of isolated active substances not contributing to the charge/discharge reaction can be decreased and high capacity can be maintained. On the other hand, when the three kinds of active substances and the conductive agent are mixed without compositing the active substances and the conductive agent, since the conductive agent is not coated on the surface of the respective active substances, the electronic conductivity is lowered. Further, the mixed state of the respective active substances and the conductive agent is worsened making it difficult to form the conductive network between the active substances and the ratio of the isolated active substances is increased to decrease the capacity.

Subsequently, the mixed material of the three kinds of active substances and the conductive agent and a binder dissolved in NMP were mixed such that the mixed material and the binder were 95.7:4.3 at mass ratio. After coating an aluminum current collector foil of 20 μm thickness with the uniformly mixed slurry, it was dried at 120° C. and compression molded by a press such that the electrode density was 2.7 g/cm$^3$. Then, the molded product was punched out into a disk-shape of 15 mm diameter to manufacture a positive electrode.

A test battery was manufactured by using the thus manufactured positive electrode, a metallic lithium for the negative electrode and a non-aqueous electrolyte (formed by dissolving 1.0 mol/liter of $LiPF_6$ to a mixed solvent of EC and DMC at 1:2 volume ratio).

Further, in a test battery according to the invention, the conductive agent, the binder, the negative electrode, the electrolyte, and the electrolyte material to be used are not restricted to those described above but, for example, the followings may also be used.

The conductive agent includes graphite, acetylene black, carbon black, etc. The binder includes polytetrafluoroethylene, rubber type binder, etc. The electrolyte includes ethylene carbonate, propylene carbonate, dimethyl carbonate, diethyl carbonate, methyl ethyl carbonate, γ-butyllactone, tetrahydrofurane, dimethoxyethane, etc.

The electrolyte material includes $LiBF_4$, $LiClO_4$, $LiAsF_6$, $LiCF_3SO_3$, $LiN(CF_3SO_2)_2$.

The following tests were conducted by using the test battery described above.

(Charge/Discharge Test)

After charging the battery to 4.3 V by constant current/constant voltage at a charge rate of 0.2 C, it was discharged to 3.0 V at a constant current at 0.2 C. Table 3 shows values obtained by dividing the values for the initial cycle discharge capacity by the values for the initial cycle discharge capacity of Comparative Example 1 will be described later.

(DSC Measurement)

After charging the battery to 4.3 V by constant current/constant voltage, the electrode was taken out of the test battery, washed with DMC and then punched out into a disk shape of 3.5 mm diameter, and placed in a sample pan. Then, after 1 µl of the electrolyte was added into the sample pan, it was tightly sealed.

The heat generating behavior of the specimen when its temperature was elevated at 5° C./min was examined. Table 3 shows the values formed by dividing the maximum value of the obtained heat flow by the maximum value of the heat flow in Comparative Example 1.

TABLE 2

| | Mixed positive electrode active substance | Mixing ratio |
| --- | --- | --- |
| Example 1 | A, B, C | 1:1:1 |
| Example 2 | A, B, C | 2:2:1 |
| Example 3 | A, B, D | 1:1:1 |
| Example 4 | A, C, E | 1:1:1 |
| Example 5 | B, C, F | 1:1:1 |
| Example 6 | A, B, G | 1:1:1 |
| Example 7 | A, B, C, E | 2:2:1:1 |
| Example 8 | A, C, H | 1:1:1 |
| Example 9 | A, C, I | 1:1:1 |
| Comp. Example 1 | A | — |
| Comp. Example 2 | B | — |
| Comp. Example 3 | C | — |
| Comp. Example 4 | A, C | 1:1 |
| Example 10 | A, B, C | 8:1:1 |
| Example 11 | D, F, G | 1:1:1 |

TABLE 3

| | Discharge capacity (Examples, Comparative Example/Comparative Example 1) | Maximum value for heat flow (Examples, Comparative Example/ Comparative Example 1) |
| --- | --- | --- |
| Example 1 | 1.001 | 0.35 |
| Example 2 | 1.025 | 0.48 |
| Example 3 | 0.991 | 0.36 |
| Example 4 | 0.983 | 0.44 |
| Example 5 | 1.028 | 0.43 |
| Example 6 | 0.953 | 0.44 |
| Example 7 | 1.011 | 0.47 |
| Example 8 | 0.994 | 0.44 |
| Example 9 | 1.000 | 0.35 |
| Comp. Example 1 | 1.000 | 1.00 |
| Comp. Example 2 | 1.047 | 0.87 |
| Comp. Example 3 | 0.947 | 1.17 |
| Comp. Example 4 | 0.975 | 0.58 |
| Example 10 | 0.996 | 0.83 |
| Example 11 | 0.912 | 0.41 |

Example 2

In Example 2, a test battery was manufactured by the same method as in Example 1 except for mixing the prepared transition metal oxides A, B, and C at mass ratio of 2:1:1 for use as the positive electrode active substance, and the charge/discharge test and the DSC measurement were conducted.

Example 3

In Example 3, a test battery was manufactured by the same method as in Example 1 except for mixing the prepared transition metal oxides A, B, and D at mass ratio of 1:1:1 for use as the positive electrode active substance, and the charge/discharge test and the DSC measurement were conducted.

Example 4

In Example 4, a test battery was manufactured by the same method as in Example 1 except for mixing the prepared transition metal oxides A, B, and E at mass ratio of 1:1:1 for use as the positive electrode active substance, and the charge/discharge test and the DSC measurement were conducted.

Example 5

In Example 5, a test battery was manufactured by the same method as in Example 1 except for mixing the prepared transition metal oxides B, C, and F at mass ratio of 1:1:1 for use as the positive electrode active substance, and the charge/discharge test and the DSC measurement were conducted.

Example 6

In Example 6, a test battery was manufactured by the same method as in Example 1 except for mixing the prepared transition metal oxides A, B, and G at mass ratio of 1:1:1 for use as the positive electrode active substance, and the charge/discharge test and the DSC measurement were conducted.

Example 7

In Example 7, a test battery was manufactured by the same method as in Example 1 except for mixing the prepared transition metal oxides A, B, C, and E at mass ratio of 2:2:1:1 for use as the positive electrode active substance, and the charge/discharge test and the DSC measurement were conducted.

Example 8

In Example 8, a test battery was manufactured by the same method as in Example 1 except for mixing the prepared transition metal oxides A, C, and H at mass ratio of 1:1:1 for use as the positive electrode active substance, and the charge/discharge test and the DSC measurement were conducted.

Example 9

In Example 9, a test battery was manufactured by the same method as in Example 1 except for mixing the prepared transition metal oxides A, C, and I at mass ratio of 1:1:1 for use as the positive electrode active substance, and the charge/discharge test and the DSC measurement were conducted.

Comparative Example 1

In Comparative Example 1, a test battery was manufactured in the same manner as in Example 1 except for using the prepared transition metal oxide A as the positive electrode active substance, and the charge/discharge test and the DSC measurement were conducted.

Comparative Example 2

In Comparative Example 2, a test battery was manufactured in the same manner as in Example 1 except for using the prepared transition metal oxide B as the positive electrode active substance, and the charge/discharge test and the DSC measurement were conducted.

Comparative Example 3

In Comparative Example 3, a test battery was manufactured in the same manner as in Example 1 except for using the prepared transition metal oxide C as the positive electrode active substance, and the charge/discharge test and the DSC measurement were conducted.

Comparative Example 4

In Comparative Example 4, a test battery was manufactured by the same method as in Example 1, except for mixing the prepared transition metal oxides A, and C at mass ratio of 1:1 for use as the positive electrode active substance, and the charge/discharge test and the DSC measurement were conducted.

Example 10

In Example 10, a test battery was manufactured by the same method as in Example 1, except for mixing the prepared transition metal oxides A, B, and C at mass ratio of 8:1:1 for use as the positive electrode active substance, and the charge/discharge test and the DSC measurement were conducted.

Example 11

In Example 11, a test battery was manufactured by the same method as in Example 1, except for mixing the prepared transition metal oxides D, F, and G at mass ratio of 1:1:1 for use as the positive electrode active substance, and the charge/discharge test and the DSC measurement were conducted.

The result of the charge/discharge test shown in Table 3 is discussed as follows. It was found for the discharge capacity in Examples 1 to 7 that values of 95 to 105% were obtained when compared with the value in Comparative Example 1. In the positive electrode active substances of Examples 1 to 7, since a positive electrode active substance having a higher Ni content and capable of obtaining higher capacity and a transition metal oxide having a reduced Ni content and a lower capacity were mixed each about in an identical amount to the transition metal oxide A used in Comparative Example 1, no remarkable deterioration did not occur in the capacity.

Further, in Comparative Examples 3, high discharge capacity could not be obtained unlike Examples 1 to 9. This is because only the positive electrode active substance of low Ni content is used in Comparative Example 3. And because the mass % of the active substance of high Ni content is low in the three kinds of mixed positive electrode active substances in Example 11, values of 91% in high discharge capacity is not so were obtained.

The result of the DSC measurement shown in Table 3 revealed that the maximum value of heat generation in the DSC measurement in Examples 1 to 9 was 50% or less for the maximum value in Comparative Example 1.

On the other hand, in Comparative Examples 4, the maximum value for the heat generation was about 58% for the maximum value in Comparative Example 1, and the maximum value of the heat flow could not be decreased greatly.

Further, in Comparative Example 4, since the positive electrode was formed by mixing two kinds of positive electrode active substances and each of the mass % of the positive electrode active substances was 50%, the mass % of one kind of the transition metal oxide was higher compared with that in Examples 1 to 9. Therefore, heat generation in a certain temperature range could not be suppressed. In Example 11, since the transition metal oxide A was contained by 80 mass %, heat generation in a certain temperature range was 83%.

The mixed positive electrode material of the invention is prospective as a material of a lithium ion secondary battery for plug-in hybrid cars.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A lithium ion secondary battery comprising:
   a positive electrode, a negative electrode, a separator located between the cathode and the anode, and a non-aqueous electrolyte,
   wherein the positive electrode has mixture of at least three kinds of transition metal oxides as a positive electrode active substance, said transition metal oxide represented by $Li_xNi_aMn_bCo_cM_dO_2$, in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and $a+b+c+d=1.0$, and each transition metal oxide having different nickel contents,
   wherein M is Al or Ti or combinations thereof when $d>0$,
   wherein said transition metal oxides comprise first, second and third transition metal oxide,
   wherein the first transition metal oxide is represented by formula $Li_{x1}Ni_{a1}Mn_{b1}Co_{c1}M_{d1}O_2$, in which $0.2 \leq x1 \leq 1.2$, $0.7 \leq a1 \leq 0.9$, $0.05 \leq b1 \leq 0.25$, $0.05 \leq c1 \leq 0.25$, $0 \leq d1 \leq 0.1$, and $a1+b1+c1+d1=1.0$,
   the second transition metal oxide is represented by formula $Li_{x2}Ni_{a2}Mn_{b2}Co_{c2}M_{d2}O_2$, in which $0.2 \leq x2 \leq 1.2$, $0.55 \leq a2 \leq 0.8$, $0.05 \leq b2 \leq 0.4$, $0.05 \leq c2 \leq 0.4$, $0 \leq d2 \leq 0.1$, and $a2+b2+c2+d2=1.0$,
   the third transition metal oxide is represented by formula $Li_{x3}Ni_{a3}Mn_{b3}Co_{c3}M_{d3}O_2$, in which $0.2 \leq x3 \leq 1.2$, $0.2 \leq a3 \leq 0.65$, $0.05 \leq b3 \leq 0.5$, $0.05 \leq c3 \leq 0.5$, $0 \leq d3 \leq 0.1$, $a3+b3+c3+d3=1.0$, and
   in which $a3<a2<a1$.
2. The lithium ion secondary battery according to claim 1, wherein each of the transition metal oxides is contained in an amount of 10 mass % to 50 mass %.
3. The lithium ion secondary battery according to claim 1, wherein the difference in a in the nickel content between the transition metal oxides is 0.05 to 10.65.
4. The lithium ion secondary battery according to claim 1, wherein an amount of the transition metal oxide which satisfies $0.7 \leq a$ is 60 mass % to 80 mass % of said at least three transition metal oxides.
5. A positive electrode material for a lithium ion secondary battery, comprising at least three kinds of transition metal oxides,
   each transition metal oxide represented by formula $Li_xNi_aMn_bCo_cM_dO_2$, in which $0.2 \leq x \leq 1.2$, $0.2 \leq a \leq 0.9$, $0.05 \leq b \leq 0.5$, $0.05 \leq c \leq 0.5$, $0 \leq d \leq 0.1$, and $a+b+c+d=1.0$, and
   each transition metal oxide has different value of a in said formula,
   wherein M is Al, Ti, or combinations thereof when $d>0$,
   wherein said transition metal oxides comprise first, second and third transition metal oxide,
   wherein the first transition metal oxide is represented by formula $Li_{x1}Ni_{a1}Mn_{b1}Co_{c1}M_{d1}O_2$, in which

$0.2 \leq x1 \leq 1.2$, $0.7 \leq a1 \leq 0.9$, $0.05 \leq b1 \leq 0.25$, $0.05 \leq c1 \leq 0.25$, $0 \leq d1 \leq 0.1$, and $a1+b1+c1+d1=1.0$, the second transition metal oxide is represented by formula $Li_{x2}Ni_{a2}Mn_{b2}Co_{c2}M_{d2}O_2$, in which $0.2 \leq x2 \leq 1.2$, $0.55 \leq a2 \leq 0.8$, $0.05 \leq b2 \leq 0.4$, $0.5 \leq c2 \leq 0.4$, $0 \leq d2 \leq 0.1$, and $a2+b2+c2+d2=1.0$, the third transition metal oxide is represented by formula $Li_{x3}Ni_{a3}Mn_{b3}Co_{c3}M_{d3}O_2$, in which $0.2 \leq x3 \leq 1.2$, $0.2 \leq a3 \leq 0.65$, $0.05 \leq b3 \leq 0.5$, $0.05 \leq c3 \leq 0.5$, $0 \leq d3 \leq 0.1$, $a3+b3+c3+d3=1.0$, and in which $a3 < a2 < a1$.

6. The positive electrode material according to claim 5, wherein each transition metal oxide is contained in an amount of 10 mass % to 50 mass %.

7. The positive electrode material according to claim 5, wherein the difference in a in the nickel content between the transition metal oxides is 0.05 to 0.65.

8. The positive electrode material according to claim 5, wherein an amount of the transition metal oxides which satisfies $0.7 \leq a$ is 60 mass % to 80 mass % of said at least three transition metal oxides.

* * * * *